US008024501B2

(12) United States Patent
van Engelen et al.

(10) Patent No.: US 8,024,501 B2
(45) Date of Patent: *Sep. 20, 2011

(54) SERIAL DATA INTERFACE SYSTEM AND METHOD USING A SELECTIVELY ACCESSED TONE PATTERN GENERATOR

(75) Inventors: Josephus A. E. P. van Engelen, Aliso Viejo, CA (US); Michael A. Sosnoski, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,572

(22) Filed: Jan. 5, 2009

(65) Prior Publication Data
US 2009/0119426 A1 May 7, 2009

Related U.S. Application Data

(63) Continuation of application No. 10/656,234, filed on Sep. 8, 2003, now Pat. No. 7,480,751.

(51) Int. Cl.
  *G06F 13/00* (2006.01)
  *G06F 3/00* (2006.01)
  *H04L 5/14* (2006.01)
(52) U.S. Cl. ............ 710/71; 710/52; 710/105; 710/106; 710/302; 710/306; 370/276; 370/525
(58) Field of Classification Search ............ 710/52, 710/71, 105, 106, 305, 315; 370/276, 525; 713/302, 305, 310
See application file for complete search history.

(56) References Cited

U.S. PATENT DOCUMENTS

| | | | |
|---|---|---|---|
| 4,862,514 A * | 8/1989 | Kedjierski | 455/161.2 |
| 5,264,958 A | 11/1993 | Johnson | |
| 5,559,967 A * | 9/1996 | Oprescu et al. | 710/105 |
| 5,737,364 A * | 4/1998 | Cohen et al. | 375/220 |
| 5,909,464 A * | 6/1999 | Cohen et al. | 375/220 |
| 6,037,828 A | 3/2000 | Fotouhi | |
| 6,295,519 B1 | 9/2001 | Wagner et al. | |
| 6,477,605 B1 * | 11/2002 | Taki et al. | 710/302 |
| 6,519,544 B1 * | 2/2003 | Deguchi et al. | 702/117 |
| 6,727,728 B1 | 4/2004 | Bitting | |
| 6,965,950 B1 | 11/2005 | Nagasawa et al. | |
| 7,036,031 B2 * | 4/2006 | Takeuchi | 713/323 |

(Continued)

OTHER PUBLICATIONS

1394, Agere Systems Inc., from http://www.agere/cpm/entnet/1394. html, 2 pages, printed Mar. 17, 2006 (Copyright 2002-2006).

(Continued)

*Primary Examiner* — Tammara Peyton
(74) *Attorney, Agent, or Firm* — Sterne, Kessler, Goldstein & Fox P.L.L.C.

(57) ABSTRACT

A system and method performs speed and connection handshaking between Beta signal ports and/or Bilingual ports in a serial data interface system. A tone pattern generator (e.g., a flip-flop) can be used to generate a tone pattern signal representing approximately 49 MHz to approximately 62 MHz. A selecting system (e.g., a multiplexer, a digital multiplexer, or the like) selectively transmits either the tone pattern signal or a data input signal. These signals include a driver control signal. A serializer serializes either the tone pattern signal or the data input signal. A clock device (e.g., a clock divider) drives the tone pattern generator and the serializer. A driver receives and differentially transmits, along a twister-wire pair, either the serialized tone pattern signal or the serialized data input signal.

19 Claims, 8 Drawing Sheets

U.S. PATENT DOCUMENTS

| | | | |
|---|---|---|---|
| 7,480,751 | B2 | 1/2009 | van Engelen et al. |
| 7,861,025 | B2 * | 12/2010 | Whitby-Strevens .......... 710/305 |
| 2001/0007436 | A1 | 7/2001 | Dosho et al. |
| 2001/0036227 | A1 * | 11/2001 | Matsuo et al. ................ 375/224 |
| 2003/0014682 | A1 * | 1/2003 | Schmidt ........................ 713/500 |
| 2003/0065859 | A1 | 4/2003 | Dao et al. |
| 2003/0067884 | A1 | 4/2003 | Abler et al. |
| 2004/0103219 | A1 | 5/2004 | Okazaki et al. |
| 2004/0114585 | A1 * | 6/2004 | Kraemer ........................ 370/366 |
| 2004/0133912 | A1 * | 7/2004 | Thomas et al. ................ 725/80 |
| 2004/0218052 | A1 | 11/2004 | DiDomenico et al. |
| 2005/0021890 | A1 | 1/2005 | Baker et al. |
| 2005/0036506 | A9 | 2/2005 | Dove |
| 2005/0060471 | A1 | 3/2005 | van Engelen et al. |
| 2005/0117633 | A1 * | 6/2005 | Schmidt ........................ 375/219 |

OTHER PUBLICATIONS

1394, Philips, from http://www.semiconductors.philips.com/products/connectivity-/1394/index.html, 2 pages, printed Mar. 17, 2006 (Copyright 2004-2005).

*1394 Integrated Devices Product Home from Texas Instruments*, Texas Instruments Inc., from http://focus.ti.com/paramsearch/docs/parametricsearch.tsp?family=analog&family-Id=547&uiTemplateId=NODE_STRY_PGE_T&paramCriteria=no, 2 pages, printed Mar. 17, 2006 (Copyright 1995-2005).

*FW803 Phy IEEE\* 1394A Three-Cable Transceiver/Arbiter Device*, Data Sheet, Rev. 3, Agere Systems Inc., 24 pages (Jun. 2001).

*PDI1394P21 3-port 400 Mbps physical layer interface*, Data Sheet, Philips, 40 pages. (Sep. 6, 2001).

*PDI1394P23 2-port/1-port 400 Mbps physical layer interface*, Data Sheet, Philips, 42 pages (Sep. 6, 2001).

*TSB41AB3 IEEE 1394a-2000 Three-Port Cable Transceiver/Arbiter*, Texas Instruments Inc., 50 pages (Copyright 2001).

*TSB81 BA3 IEEE 1394b Three-Port Cable Transceiver/Arbiter*, Texas Instruments Inc., 57 pages (Copyright 2002).

*IEEE Standard for a High Performance Serial Bus, IEEE Std*. 1394-1995, entire document submitted (Copyright 1996).

*IEEE Standard for a High Performance Serial Bus-Amendment 1*, IEEE Std. 1394a-2000, entire document submitted (Copyright 2000).

*1394b™ IEEE Standard for a High Performance Serial Bus-Amendment 2, IEEE* Std. 1394b™ 2002, entire document submitted (Copyright 2002).

\* cited by examiner

SERIAL DATA INTERFACE SYSTEM AND METHOD USING A SELECTIVELY ACCESSED TONE PATTERN GENERATOR

CROSS REFERENCE TO RELATED APPLICATIONS

This application is a continuation of U.S. application Ser. No. 10/656,234, filed Sep. 8, 2003 (now U.S. Pat. No. 7,480,751), which is incorporated by reference herein in its entirety.

BACKGROUND OF THE INVENTION

1. Field of the Invention

The present invention is related to toning for connectivity and speed handshaking in Beta and/or Bilingual ports of IEEE1394 devices.

2. Background Art

Several specifications or standards have been implemented that specify requirements for FireWire (Apple), i.link (Sony), and IEEE1394. These standards were implemented in 1995 (IEEE1394-1995), 2000 (IEEE-1394a-2000), and 2002 (IEEE1394b-2002). All the standards for IEEE1394 describe a general high speed serial interface or a serial bus for cable or backplane media to transmit and receive data traveling at about 25 Mbit/sec (Mbps) to about 2 Gbit/sec (2 Gbps), with higher speeds contemplated in the future. IEEE1394b is intended to provide more media (e.g., optical media, UTP-5 cable, etc.) and higher data rates. The 1995 and 2000 standards are usually collectively referred to as Legacy or DS (data-strobe) and the 2002 standard is referred to as Beta.

Requirements for a Bilingual port have also been added to the IEEE1394 specifications. A Bilingual port is a single port that includes a system allowing for transceiving of both Legacy and Beta signals. For example Bilingual ports, reference can be made to U.S. patent application Ser. No. 10/660,670, filed Sep. 12, 2003, entitled "Serial Data Interface System And Method Having Bilingual Functionality," to van Engelen et al., which is incorporated by reference herein in its entirety.

Conventional functionality and devices described in detail in the standards noted above are not repeated within this document. The standards listed above are all incorporated by reference herein in their entireties.

Beta signaling is usually done using serializer/deserializer (SerDes) technology for its dual simplex signaling scheme. For example, when two twisted-pairs (TPs) are used for the short-haul copper media, a first TP is used only to transmit from a serializer and a second TP is used only to receive at a deserializer. All idle, arbitration, and packet speed information is transmitted as symbols in the data, which can allow for continuous clock recovery. A special toning scheme is used to check for connection and signal speed. An on/off keyed tone is sent as a differential output signal with a certain output amplitude, frequency, and repetition.

As discussed above, toning is used for speed and connectivity determination in Beta signal ports. Therefore, what is needed is a simple and inexpensive system and method for toning.

BRIEF SUMMARY OF THE INVENTION

Embodiments of the present invention provide a system and method for performing speed and connection handshaking between Beta signal systems in serial data interface devices. A tone pattern generator (e.g., a flip-flop) can be used to generate a tone pattern signal representing a signal approximately 49 MHz to approximately 62 MHz. A selecting system (e.g., a multiplexer) selectively transmits either the tone pattern signal or a data input signal. These signals include a driver control signal. A serializing device serializes either the tone pattern signal or the data input signal. A clock device (e.g., a clock divider) drives the tone pattern generator and the serializing device. A driver receives and differentially transmits either the serialized tone pattern signal or the serialized data input signal.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system and method for performing speed and connection handshaking between Beta signal systems in serial data interface devices. Handshaking is done using a signal approximately 49 MHz to approximately 62 MHz, as discussed above. A tone pattern generator (e.g., a flip-flop) can be used to generate a tone pattern signal representing the approximately 49 MHz to approximately 62 MHz signal.

A specified number of HIGH and LOW signals can be continuously generated at a predetermined rate in order to output the approximately 49 MHz to approximately 62 MHz tone pattern signal from the Beta signal system. For example, at S800 data rate, 10 HIGHS and 10 LOWS can be generated in order to form an approximately 49.152 MHz tone signal.

A selecting system (e.g., a multiplexer, a digital multiplexer, or the like) selectively transmits either the tone pattern signal or a data input signal that is input from a PHY digital core. Either the tone pattern or the data input is serialized using a serializing system. Serialized tone or data signals are differentially transmitted along the media (e.g. the twisted pairs in cables of the short-haul copper media), via a driver, to peer serial data interface devices.

Overview of IEEE 1394 System

Figure 1:
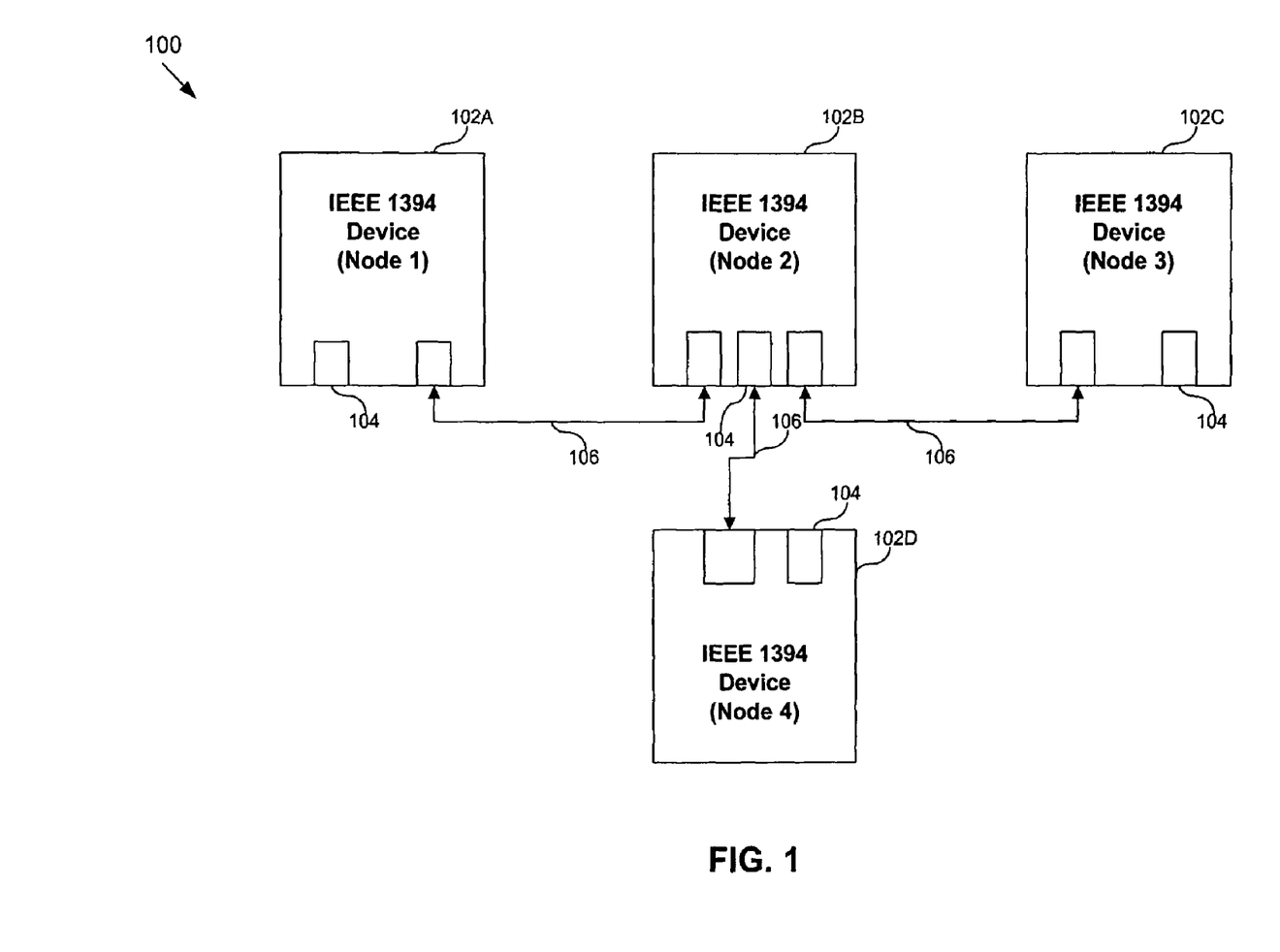
FIG. 1 shows an IEEE1394 system.

FIG. 1 is a block diagram of a section 100 of an IEEE 1394 system including a plurality of nodes 102 (e.g., 102A-102D) according to embodiments of the present invention. Up to 1000 systems 100 can be interconnected, and each system 100 can include, for example, up to 63 peers or nodes 102. Nodes 102 include one or more ports 104. Nodes 102 having multiple ports 104 behave as repeaters. Loops are generally not allowed, so all nodes 102 are connected in a tree structure via cables 106. Each cable 106 includes at least two twisted-wire pairs (TPs). Node-to-node (e.g., peer-to-peer) connections can be at various speeds and using various modes (e.g., Legacy or Beta). Arbitration is used to determine which node 102 can talk on a particular bus to another node. An algorithm is used to process requests from nodes 102 to determine which node 102 will talk on the bus at a particular time period.

Bus speeds or signaling speeds are based on multiples of a base speed S100 that is formed from multiples of 24.576 MHz. Base Legacy speed S100 is about 98.304 Mbps and base Beta speed S100 is about 122.88 Mbps. Every port 102 has to support lower speeds than its rated speed. For example, a Legacy S400 port must support Legacy S200 and Legacy S100.

Data transfer is packet based using either Isochronous (e.g., periodic, guaranteed bandwidth, usually video, audio, etc.) or Asynchronous (e.g., a-periodic, usually data transfer, etc.) packets. As discussed above, data can be sent over several media, which can include copper twisted pair cables, glass, fiber, or other interconnect materials. The material used can depend on the data speed and/or the standard or mode of the signals (e.g., Legacy or Beta). The mode also dictates a number of pins (e.g., Legacy 4 or 6 and Beta 9) required for connectors coupled to either end of the cables 106, in the case of the copper twisted pair (TP) media Legacy signaling (e.g., data or strobe signals) is performed using half-duplex signaling. For example, a Legacy system has a TP bias (TPBIAS) system (e.g., for setting and controlling signal speed, common mode voltage, checking connections, and other functions) and first and second TPs. For half-duplex signaling, sending or receiving of signals is performed using both the first and second TPs, but sending and receiving is not done at the same time.

Figure 4:
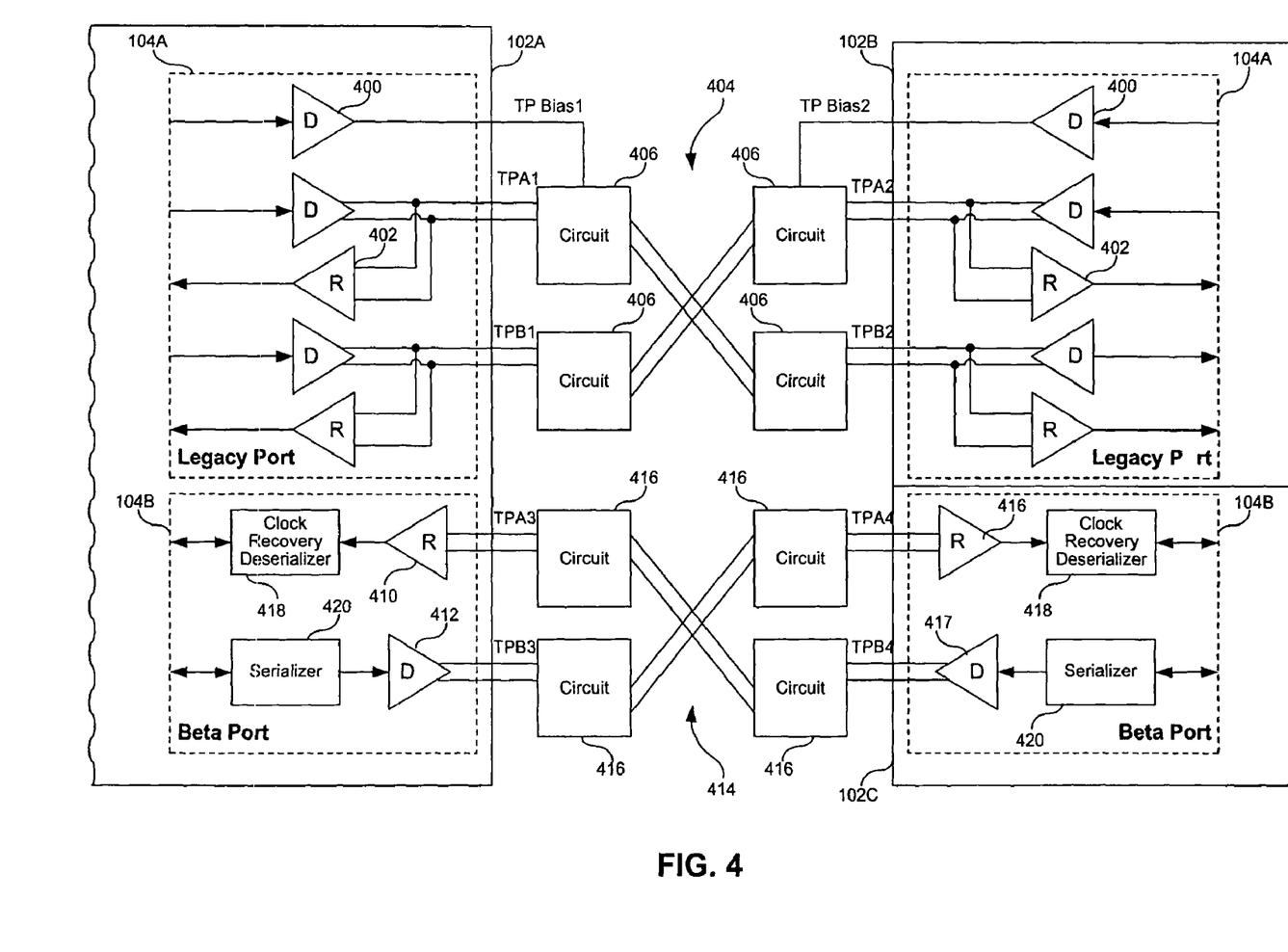
FIG. 4 shows a typical peer-to-peer connection scheme between Legacy and Beta ports, in the case of copper twisted pair (TP) cable media.

FIG. 4 shows a typical IEEE 1394 connection scheme for Legacy ports 104A and Beta ports 104B between nodes 102A, 102B, and 102C, respectively. Signals from the first and second TPs (e.g., TPA1 and TPB1) cross. For example, during transmitting, TPA1 at a first node 102A transmits a signal that is received by TPB2 at a second node 102B. Data traveling from a first node 102A along TPA1 is used by second node 102B along TPB2.

The data and strobe signals are differential binary signals. Mixed speed signals can be transmitted on the same wires. Arbitration is performed using DC-like line states (e.g., 1, 0, and Z where Z indicates a high-impedance state) with no continuous clock recovery, and using asynchronous analog technology.

Beta signaling is usually performed with serializer/deserializer (SerDes) technology and using dual simplex signaling. For example, when two TPs are used, a first TPB3,4 is used only to transmit from a serializer, and a second TPA3,4 is used only to receive at a deserializer. Idle, arbitration, and packet speed information is transmitted as symbols in the data, which can allow for continuous clock recovery. Toning is used to check for connection and signal speed.

Figure 2:
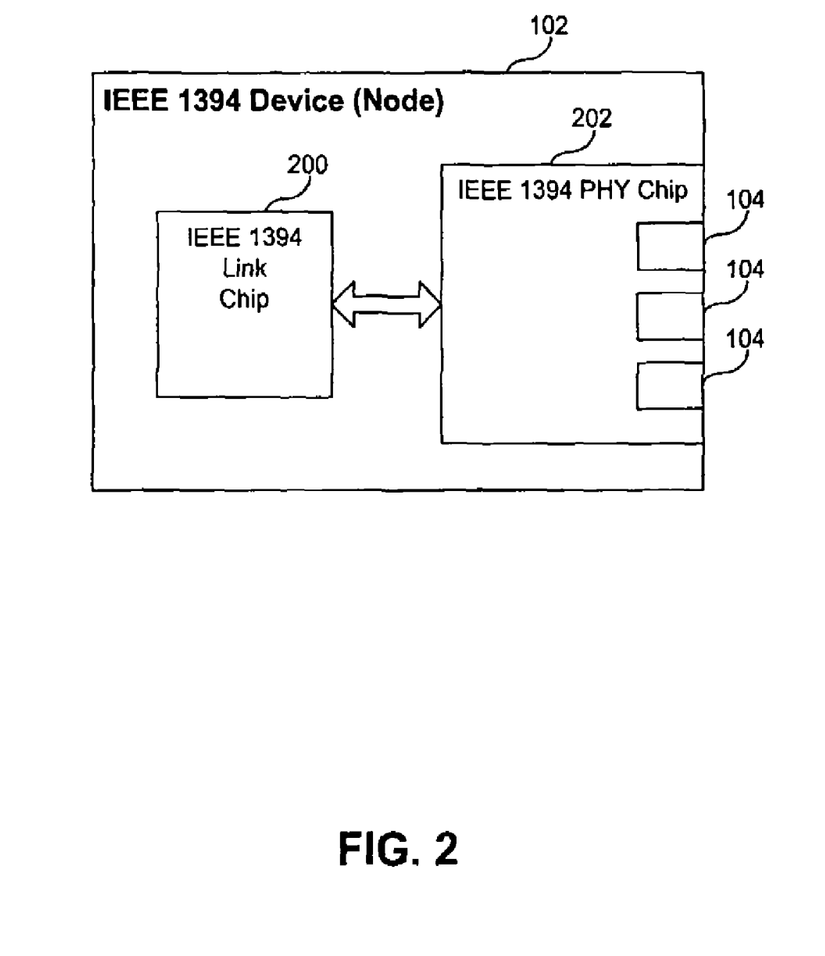
FIG. 2 shows an IEEE1394 node in the system of FIG. 1.

FIG. 2 is a block diagram of a node 102, including an IEEE1394 link chip 200, which performs a similar function as a media access controller (MAC) in the IEEE802.3 (Ethernet) standard. The node 102 also includes an IEEE 1394 physical layer device (PHY) chip 202.

Figure 3:
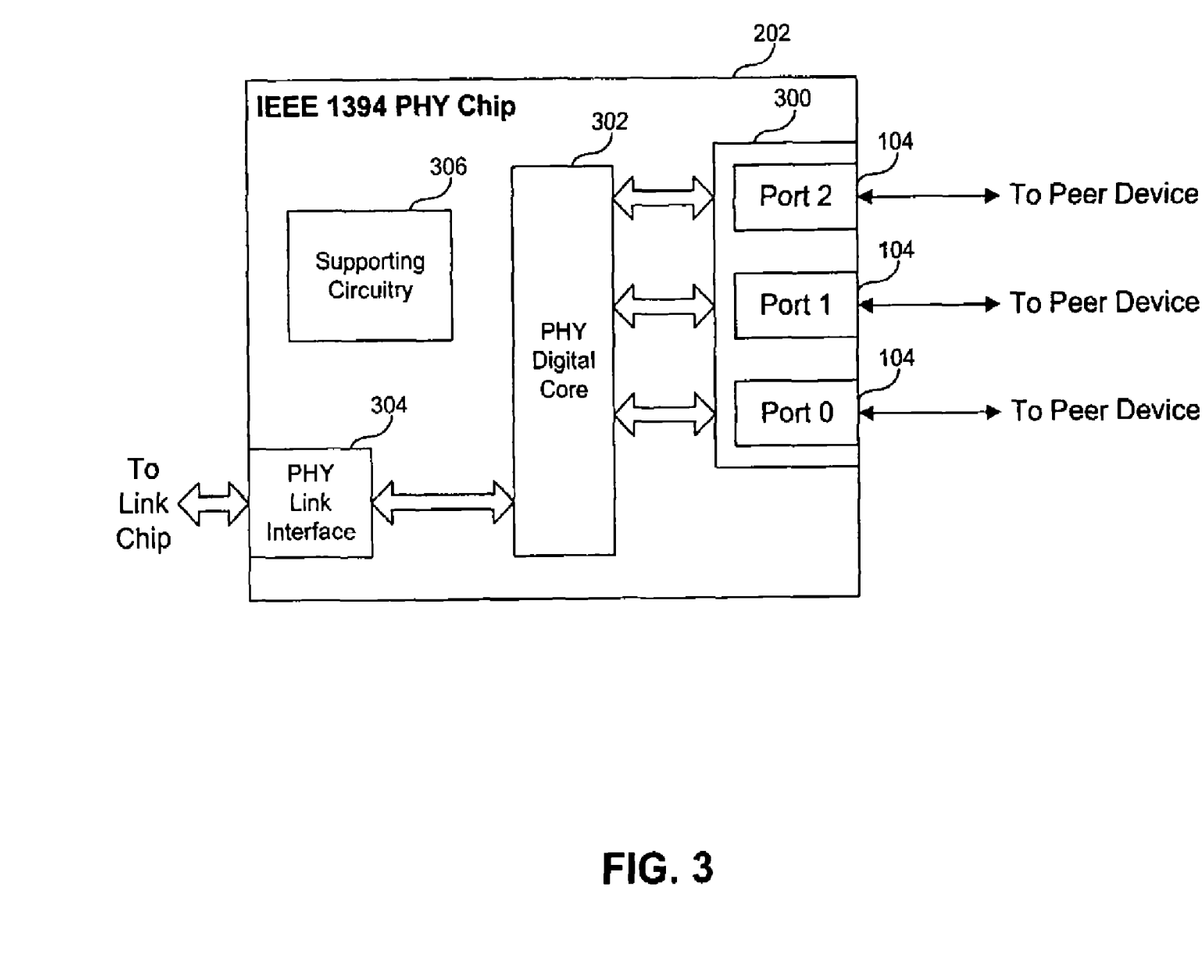
FIG. 3 shows an IEEE1394 PHY chip in the IEEE1394 node of FIGS. 1 and 2.

FIG. 3 is a block diagram of PHY chip 202. A PHY analog core 300 includes ports 104. A PHY digital core 302 processes all digital signals received and transmitted by port 104. A PHY/link interface 304 links PHY chip 202 to link chip 200. Supporting circuitry 306 is used to control, power, and other functionality, and couple these and other devices in PHY chip 202.

Returning to FIG. 4, Legacy ports 104A include drivers (D) 400 and receivers (R) 402 for directing Legacy signals. Legacy signals travel from TPA and TPB pins along TPA1,2 and TPB1,2 from ports 104A and 104B to connection systems 404 that include supporting circuitry 406. Signals from 104A and 104B are cross-connected using connection system 404 (e.g., TPA1 and TPB2 connect, while TPA2 and TPB1 connect). Doing this allows signals transmitted from a first node 102A along TPA1 to be received along TPB2 at node 102B.

Beta ports 104B include standard-based receivers (R) 410 and drivers (D) 412 for directing Beta signals. Beta signals are always received along TPA3,4 and always transmitted along TPB3,4 using connection system 414 having supporting circuitry 416. Devices 418 perform clock recovery and deserialization on received signals. Transmitted signals are serialized and transmitted using device 412 and 420 before being transmitted.

As discussed above, recently, a Bilingual mode or standard has been approved, which requires a single port 104 in PHY analog core 300 to transmit and receive all Legacy and Beta signals. For example, PHY analog core 300 could include a Legacy port 104A, a Beta port 104B, and Bilingual port 104C.

Tone Pattern Generating Systems Using Oscillators

Figure 5:
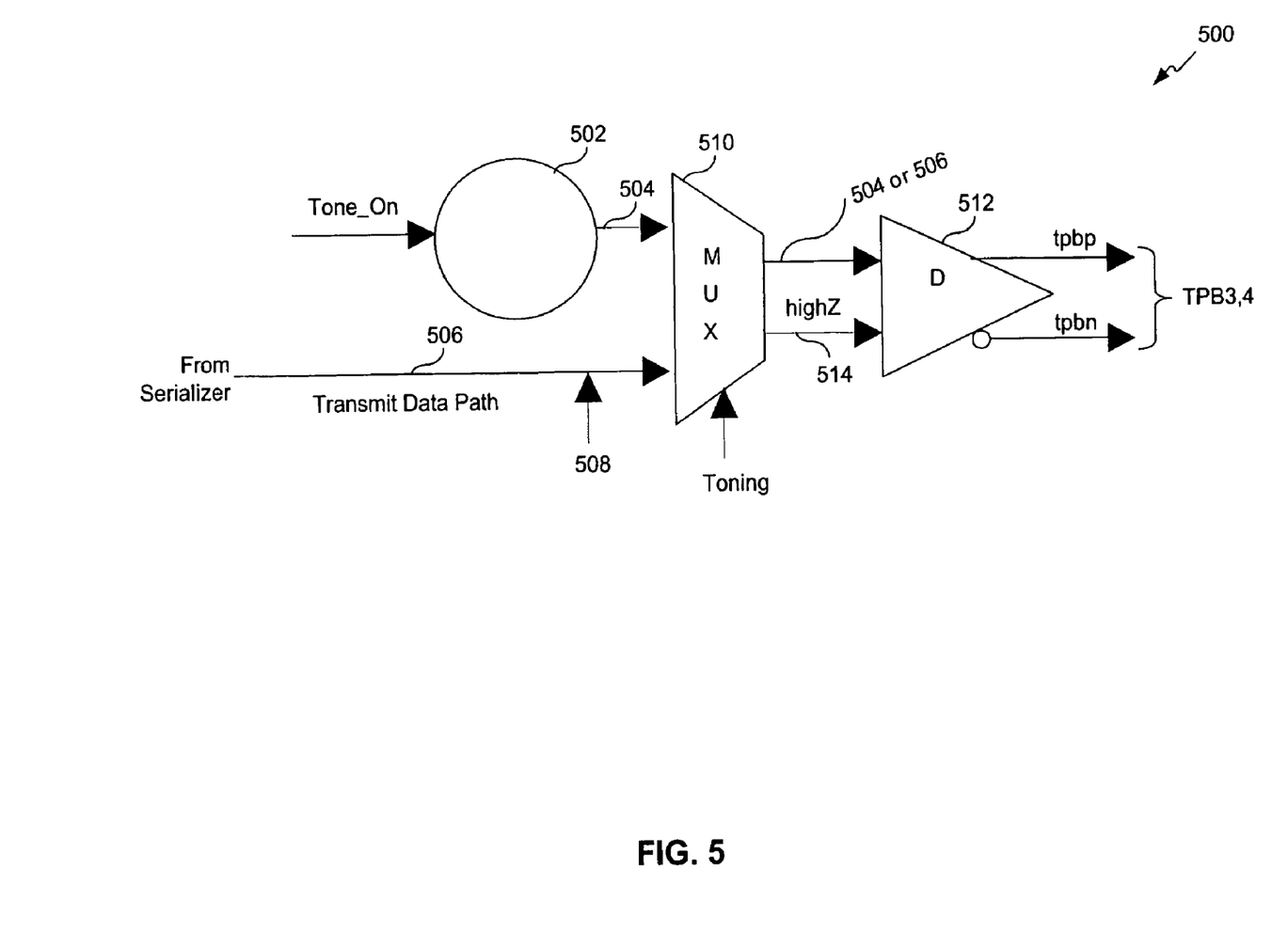
FIGS. 5, 6, 7 and 8 show various tone signal producing arrangements according to various embodiments of the present invention.

FIG. 5 shows a portion 500 of a Beta signal system having a tone pattern generating device 502 (e.g., an oscillator) according to an embodiment of the present invention. Oscillator receives a Tone_on signal from PHY digital core 302. Portion 500 uses a selecting device 510 (e.g. an analog multiplexer) to selectively transmit either a tone pattern signal 504 from oscillator 502 or a data signal 506, which is input from a serializer (not shown) (e.g., serializer 420) along data path 508. Driver 512 differentially transmits one of the signals 504 or 506 as signals tpbp and tpbn along TPB.

When data signal 506 is transmitted, it is first serialized using a serializer, as discussed above. In the embodiment shown, when tone signal 504 is being transmitted, the serializer can go into standby mode to conserve power.

Signals 504 and 506 include a driver control portion 514 (e.g., highZ) that places driver 512 in either one of two modes (e.g., high-impedance (inactive) or normal). For example, when highZ is active, driver 512 is in a high-impedance mode, which makes driver 512 inactive. In contrast, when highZ is inactive, driver 512 is a normal operating mode during which driver 512 transmits a HIGH or LOW signal based on signals 504 and 506.

Figure 6:
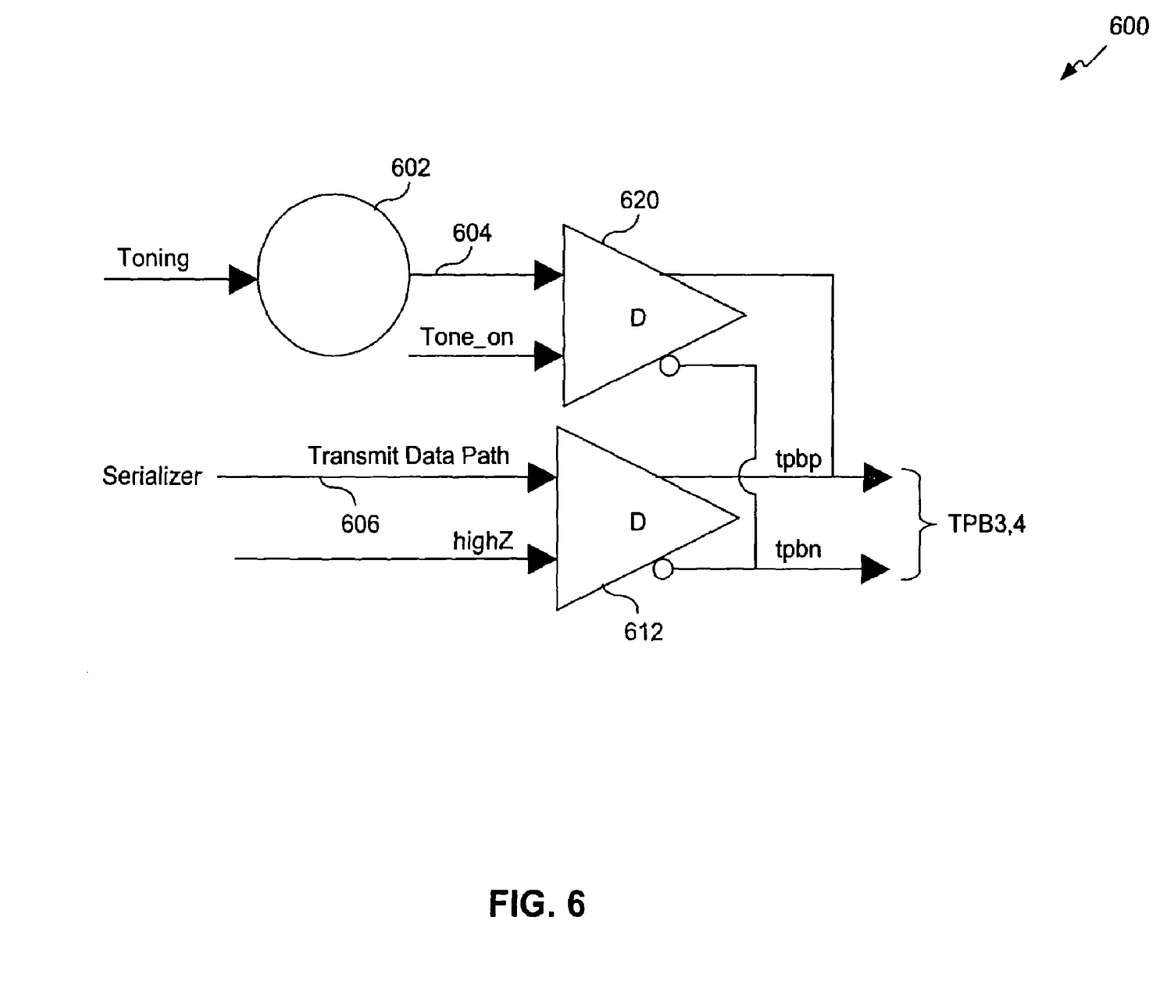

FIG. 6 shows a portion 600 of a Beta signal system having a tone pattern generating device 602 (e.g., an oscillator) according to an embodiment of the present invention. A tone signal 604 from oscillator 602 is received, along with a Tone_on signal from PHY digital core 302, at a driver 620. A second driver 612 receives data input signal 606 from a serializer (not shown) (e.g., serializer 420) and a driver control signal (e.g., highZ). Depending on which driver 612 or 620 is active, one of drivers 612 and 620 produces a differential output signal (e.g., tpbp and tpbn) along TPB3 or 4.

In this embodiment, Tone_on and High_Z control drivers 620 and 612, respectively, either making them active or inactive. When driver 620 is active, tone signal 604 is transmitted from portion 600. In this embodiment, when driver 620 is active, the serializer can be placed in stand-by mode for power savings. On the other hand, while driver 612 is active, data signal 606 is transmitted from portion 600.

Tone Pattern Generating System Using Tone Pattern Generating Device

Figure 7:
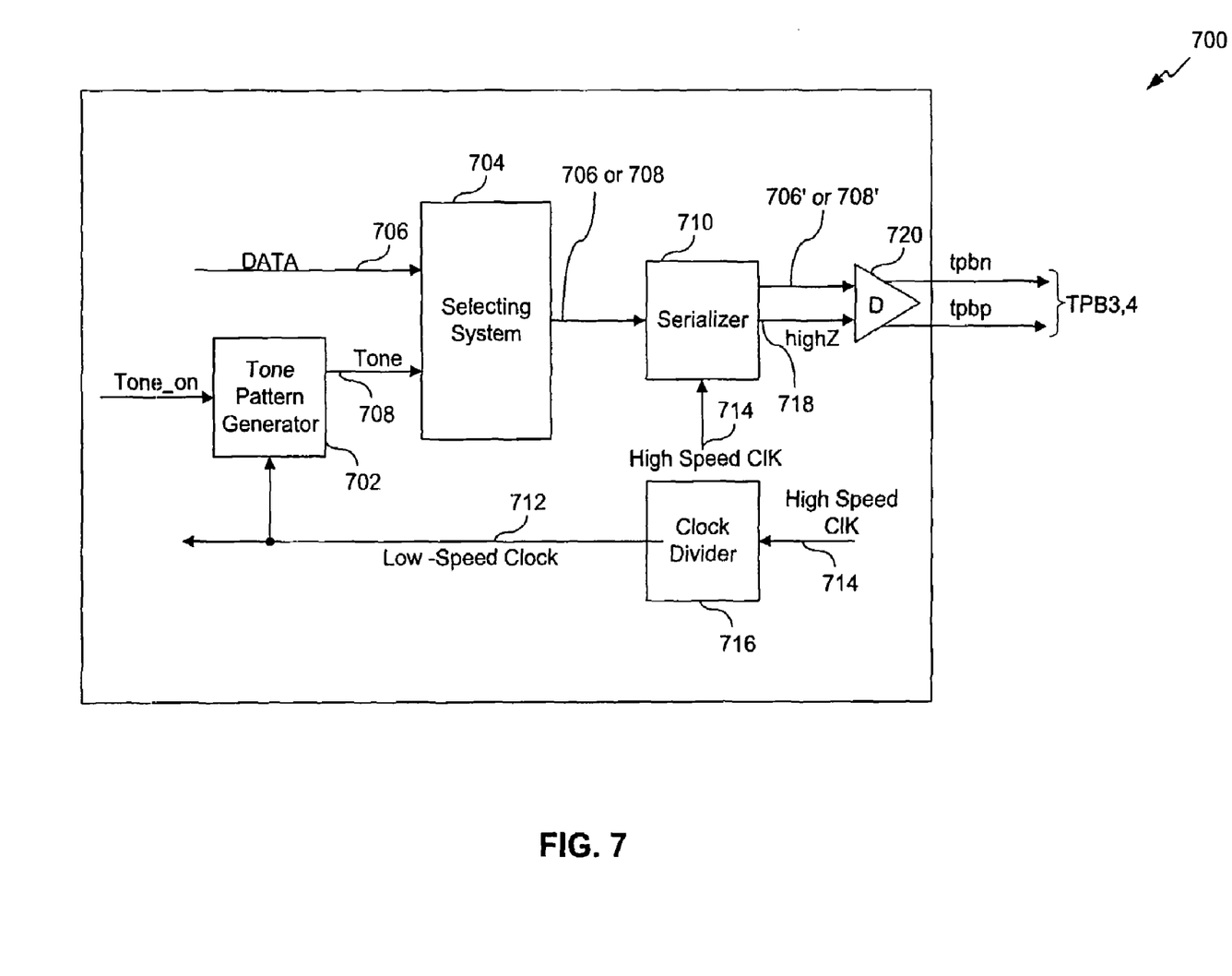

FIG. 7 shows a portion 700 of a Beta signal system according to embodiments of the present invention. A tone pattern generator 702 (e.g., a flip-flop) receiving a Tone-on signal and a selecting system 704 (e.g., a digital multiplexer) are placed into a Beta signal system. Portion 700 receives an input data signal 706 from PHY digital core 302 at a selecting system 704. Selecting system 704 also receives a tone pattern signal 708 from tone pattern generator 702. Depending on a mode of portion 700, selecting system 704 selectively passes data or tone pattern signal 706 or 708 to serializer 710. Serializer 710 and tone pattern generator 702 are both driven by low speed clock signal 712 generated from high speed clock signal 714 in clock divider 716. Serializer 710 is also driven by the high speed clock 714. Although not specifically shown, both data signal 706 and tone pattern signal 708 include a driver control portion 718 (e.g., highZ), discussed in more detail below.

Once serialized, serialized data signal 706' or serialized tone pattern signal 708' and driver control signal 718 (e.g., highZ) is directed to driver 720. When highZ is low, driver 720 differentially transmits either serialized data 706' or tone 708' signal as tpbn and tpbp along TPB3 or 4 to peer Beta signal systems (e.g., during a normal operating or active state). As discussed above, when highZ 718 is high, driver 720 is placed in a high-impedance or inactive state.

In one example, tone pattern generator 702 produces an approximately 49 MHz to approximately 62 MHz tone pattern signal 708. This can be done using a continuous string of 10 HIGH signals and 10 LOW signals produced at a predetermined rate (e.g., S800 data rate or 981.204 Mbaud/sec), which appears to peer Beta signal systems as an approximately 49.152 MHz signal. It is to be appreciated that for other data rates, a size of a string of HIGH and LOW signals will vary. This is accomplished because a clock driving serializer 710 should be very accurate and have very little jitter, which means that tone pattern signal 708 will have a very accurate frequency.

Figure 8:
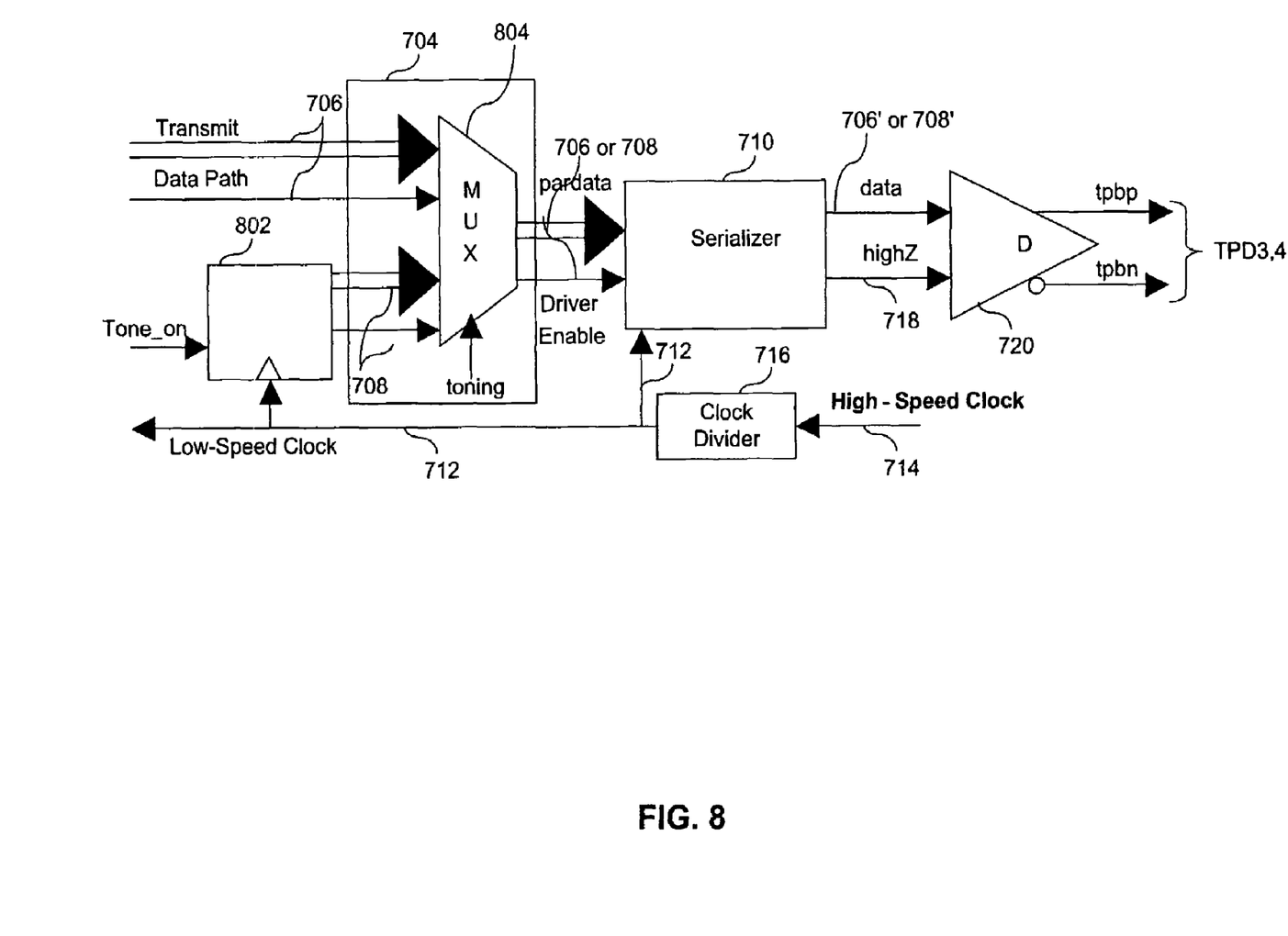

In one implementation, seen in FIG. 8, selecting system 704 can be a multiplexer 804 (e.g. a digital multiplexer) and tone generating device 702 can be a flip-flop 802. A digital multiplexer can be used, which is easier to implement than an analog multiplexer and can run at lower speeds.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
a tone pattern generator configured to generate a tone pattern signal customized for connectivity determination in accordance with a communications standard, wherein the tone pattern signal is generated to be within a predetermined frequency range supported by the communications standard for connectivity determination; and
a selecting system configured to selectively transmit the tone pattern signal or a data signal.

2. The system of claim 1, further comprising:
a serializing device, located downstream of the selecting system, operable to serialize either the tone pattern signal or the data signal.

3. The system of claim 2, further comprising:
a driver, located downstream of the serializing device, operable to transmit the tone pattern signal or the data signal.

4. The system of claim 2, wherein the serializing device is operable to go into standby mode when the tone pattern signal is transmitted.

5. The system of claim 2, wherein the serializing device is operable to conserve power when the tone pattern signal is transmitted.

6. The system of claim 1, wherein the tone pattern generator comprises an oscillator or a flip-flop.

7. The system of claim 1, wherein the communications standard is the 2002 IEEE 1394 standard.

8. The system of claim 1, wherein the tone pattern signal is customized to determine connectivity and signal speed for a port.

9. The system of claim 1, wherein the selecting system is configured to selectively transmit the tone pattern signal or a data signal based on a received signal from a PHY digital core.

10. The system of claim 3, wherein the driver is operable to transmit the tone pattern signal or the data signal based on a driver control portion of the tone pattern signal or a driver control portion of the data signal.

11. A system compromising:
a tone pattern generating device configured to generate a tone pattern signal customized for connectivity determination in accordance with a communications standard, wherein the tone pattern signal is generated to be within a predetermined frequency range supported by the communications standard for connectivity determination;
a first driver configured to:
receive the tone pattern signal and a tone-on signal, and
transmit the tone pattern signal based on an activation of the first driver; and
a second driver configured to:
receive a data signal and a diver control signal, and
transmit the data signal based on an activation of the second driver.

12. The system of claim 11, wherein the first driver and the second driver are configured to be activated using a signal that changes a mode of the first driver or the second driver.

13. The system of claim 12, wherein the first driver is configured to be activated using the tone-on signal.

14. The system of claim 12, wherein the second driver is configured to be activated using the driver control signal.

15. The system of claim 12, wherein the mode is changed from an inactive mode to a normal mode.

16. The method of claim 15, wherein the inactive mode is a high-impedance mode.

17. The system of claim 11, further comprising a serializer configured to serialize the data signal prior to transmission of the data signal by the second driver, wherein the serializer is configured to be placed in a standby mode if the first driver is active.

18. The system of claim 1, wherein the tone pattern signal comprises a continuous sequence of HIGH and LOW signals at a predetermined rate, such that the tone pattern signal represents a signal between approximately 49 MHz and approximately 62 MHz.

19. The system of claim 11, wherein the tone pattern signal comprises a continuous sequence of HIGH and LOW signals at a predetermined rate, such that the tone pattern signal represents a signal between approximately 49 MHz and approximately 62 MHz.

* * * * *

UNITED STATES PATENT AND TRADEMARK OFFICE
CERTIFICATE OF CORRECTION

| | | |
|---|---|---|
| PATENT NO. | : 8,024,501 B2 | Page 1 of 1 |
| APPLICATION NO. | : 12/348572 | |
| DATED | : September 20, 2011 | |
| INVENTOR(S) | : Josephus A. E. P. van Engelen | |

It is certified that error appears in the above-identified patent and that said Letters Patent is hereby corrected as shown below:

Column 6, line 56, delete "diver" and insert --driver--.

Signed and Sealed this
Eighteenth Day of December, 2012

David J. Kappos
*Director of the United States Patent and Trademark Office*